United States Patent
Zhou et al.

(10) Patent No.: US 11,055,574 B2
(45) Date of Patent: Jul. 6, 2021

(54) FEATURE FUSION AND DENSE CONNECTION-BASED METHOD FOR INFRARED PLANE OBJECT DETECTION

(71) Applicant: XIDIAN UNIVERSITY, Xi'an (CN)

(72) Inventors: Huixin Zhou, Xi'an (CN); Jiajia Zhang, Xi'an (CN); Yuanbin Shi, Xi'an (CN); Dong Zhao, Xi'an (CN); Lixin Guo, Xi'an (CN); Hanlin Qin, Xi'an (CN); Bingjian Wang, Xi'an (CN); Rui Lai, Xi'an (CN); Huan Li, Xi'an (CN); Jiangluqi Song, Xi'an (CN); Bo Yao, Xi'an (CN); Yue Yu, Xi'an (CN); Xiuping Jia, Xi'an (CN); Jun Zhou, Xi'an (CN)

(73) Assignee: XIDIAN UNIVERSITY, Xi'an (CN)

( * ) Notice: Subject to any disclaimer, the term of this patent is extended or adjusted under 35 U.S.C. 154(b) by 0 days.

(21) Appl. No.: 17/270,908

(22) PCT Filed: Nov. 20, 2018

(86) PCT No.: PCT/CN2018/116487
§ 371 (c)(1),
(2) Date: Feb. 24, 2021

(87) PCT Pub. No.: WO2020/102988
PCT Pub. Date: May 28, 2020

(65) Prior Publication Data
US 2021/0174149 A1 Jun. 10, 2021

(51) Int. Cl.
*G06K 9/62* (2006.01)
*G06K 9/36* (2006.01)
(Continued)

(52) U.S. Cl.
CPC ............. *G06K 9/6262* (2013.01); *G06K 9/36* (2013.01); *G06K 9/629* (2013.01); *G06K 9/6232* (2013.01);
(Continued)

(58) Field of Classification Search
CPC .. G06K 9/6262; G06K 9/6232; G06K 9/6256; G06K 9/36; G06K 9/629; G06N 3/04; G06N 3/08
See application file for complete search history.

(56) References Cited

U.S. PATENT DOCUMENTS

2017/0249445 A1* 8/2017 Devries ................ G16H 20/60
2018/0053307 A1 2/2018 Xiao
(Continued)

FOREIGN PATENT DOCUMENTS

CN 107480620 A 12/2017
CN 108133218 A 6/2018
(Continued)

*Primary Examiner* — Dhaval V Patel
(74) *Attorney, Agent, or Firm* — Bayramoglu Law Offices LLC (57) ABSTRACT

A feature fusion and dense connection-based method for infrared plane object detection includes: constructing an infrared image dataset containing an object to be recognized, calibrating a position and class of the object to be recognized in the infrared image dataset, and obtaining an original known label image; dividing the infrared image dataset into a training set and a validation set; performing image enhancement preprocessing on images in the training set, performing feature extraction and feature fusion, and obtaining classification results and bounding boxes through a regression network; calculating a loss function according to the classification results and the bounding boxes in combination with the original known label image, and updating parameter values of a convolutional neural network; repeating the steps to iteratively update the parameters of the
(Continued)

convolutional neural network; and processing images in the validation set through the parameters to obtain a final object detection result map.

14 Claims, 3 Drawing Sheets

(51) Int. Cl.
 *G06N 3/08* (2006.01)
 *G06N 3/04* (2006.01)
(52) U.S. Cl.
 CPC ............. *G06K 9/6256* (2013.01); *G06N 3/04* (2013.01); *G06N 3/08* (2013.01)

(56) References Cited

U.S. PATENT DOCUMENTS

2019/0164290 A1* 5/2019 Wang ................. G06K 9/00973
2020/0133474 A1* 4/2020 Helke ................. G06F 3/03547

FOREIGN PATENT DOCUMENTS

| CN | 108665481 | A | 10/2018 |
| CN | 108764247 | A | 11/2018 |
| EP | 2128818 | A1 | 12/2009 |

* cited by examiner

FEATURE FUSION AND DENSE CONNECTION-BASED METHOD FOR INFRARED PLANE OBJECT DETECTION

CROSS REFERENCE TO THE RELATED APPLICATIONS

This application is the national phase entry of International Application No. PCT/CN2018/116487, filed on Nov. 20, 2018.

TECHNICAL FIELD

The present invention belongs to the technical field of image processing, and more particularly, relates to a feature fusion and dense connection-based method for infrared plane object detection.

BACKGROUND

At present, existing object detection methods can be generally divided into two categories: a background modeling-based object detection method and a foreground modeling-based method. The background modeling-based method includes constructing a background model and then determining a cell that is significantly different from the background in an image as an object. This method cannot achieve a satisfactory detection effect due to the complexity of the background. The foreground modeling-based method, on the other hand, involves extracting feature information of an object and then determining a cell that highly matches the feature information of the object as the object. Additionally, the most typical method of the foreground modeling-based method now includes a deep learning-based object detection method. In the deep learning-based object detection method, object features are automatically extracted through a deep convolutional neural network to detect object classes and positions. Then, the object features are compared with calibration information in a training set to calculate a loss function, and the features extracted by the network are improved through a gradient descent method to better match the actual situation of the object. Meanwhile, parameters of the subsequent detection are updated to make the detection result more accurate. Training is continuously repeated until the desired detection effect is achieved.

SUMMARY

In order to solve the above-mentioned problems in the prior art, the present invention provides an object detection method based on feature fusion and dense blocks.

The technical solution adopted by the present invention is as follows.

An embodiment of the present invention provides a feature fusion and dense connection-based method for infrared plane object detection, including the following steps:

step 1, constructing an infrared image dataset containing an object to be recognized, calibrating a position and a class of the object to be recognized in the infrared image dataset, and obtaining an original known label image;

step 2, dividing the infrared image dataset into a training set and a validation set;

step 3, performing image enhancement preprocessing on images in the training set;

step 4, performing feature extraction and feature fusion on the preprocessed images, and obtaining classification results and bounding boxes through a regression network; calculating a loss function according to the classification results and the bounding boxes in combination with the original known label image, back-propagating a prediction error in a convolutional neural network by using a stochastic gradient descent method with momentum, and updating parameter values of the convolutional neural network;

step 5, repeating steps 3 and 4 to iteratively update the parameters of the convolutional neural network until the error is small enough or the number of iterations reaches a set upper limit; and step 6, processing images in the validation set through the parameters of the trained convolutional neural network to obtain accuracy and required time for object detection, and a final object detection result map.

In the above solution, the step of performing the feature extraction and the feature fusion on the preprocessed images, and obtaining the classification results and the bounding boxes through the regression network in step 4 specifically includes the following steps:

step 401, randomly extracting a fixed number of images from the training set, and dividing each image into 10×10 cells;

step 402, inputting the image divided in step 401 into a densely connected network for feature extraction;

step 403, performing feature fusion on the extracted feature maps to obtain a fused feature map;

step 404, generating a fixed number of suggestion boxes for each cell in the fused feature map; and step 405, sending the fused feature map and the suggestion boxes to the regression network for classification and bounding box regression, and removing redundancy by using a non-maximum suppression method to obtain the classification results and the bounding boxes.

In the above solution, a calculation method for the densely connected network in step 402 is expressed as the following formula:

$$d_l = H_l([d_0, d_1, \ldots, d_{l-1}]);$$

wherein, $d_l$ represents an output result of an $l^{th}$ convolutional layer in the densely connected network, and if the densely connected network contains a total of B convolutional layers, then the value of l is in the range of 0-B; $H_l(*)$ represents a combined operation of regularization, convolution and linear rectification activation function; $d_0$ is an input image; and $d_{l-1}$ represents an output result of an $(l-1)^{th}$ layer.

In the above solution, the step of performing the feature fusion on the extracted feature maps in step 403 includes: directly fusing the extracted feature maps of different scales through a pooling method.

In the above solution, the step of performing the feature fusion on the extracted feature maps in step 403 specifically includes the following steps:

step 4031, converting a first group of feature maps $F_1$ into a new smaller feature map through a pooling operation, and then fusing the new smaller feature map with a second group of feature maps $F_2$ to obtain a new feature map $F_2'$;

step 4032, performing a pooling operation on the new feature map $F_2'$, and then fusing with a third group of feature maps $F_3$ to obtain a new feature map $F_3'$; and step 4033, replacing the second group of feature maps $F_2$ and the third group of feature maps $F_3$ with the new feature map $F_2'$ and the new feature map $F_3'$ to enter the regression network.

In the above solution, the step of sending the fused feature map and the suggestion boxes to the regression network for classification and bounding box regression, and removing redundancy by using the non-maximum suppression method to obtain the classification results and the bounding boxes in step 405 specifically includes the following steps:

step 4051, dividing the feature map into 10×10 cells, and inputting the feature map into a regression detection network;

step 4051, for each cell, outputting positions and classes of 7 possible objects by the regression detection network, wherein the objects include A classes in total, that is, probabilities corresponding to the A classes of objects are output, wherein A is related to a setting of the training set; and a position parameter includes 3 pieces of data including center position coordinates, a width and a height of an object bounding box;

step 4052, according to the non-maximum suppression method, calculating an intersection-over-union of obtained bounding boxes of the same class by using the following formula:

$$S = \frac{M \cap N}{M \cup N};$$

wherein, S represents the calculated intersection-over-union, M and N represent the two bounding boxes of objects of the same class, M∩N represents an intersection of the bounding box M and the bounding box N, and M∪N represents a union of the bounding box M and the bounding box N; and removing a bounding box with a smaller classification result value from the two bounding boxes with S greater than 0.75.

In the above solution, the step of calculating the loss function according to the classification results and the bounding boxes in combination with the original known label image, back-propagating the prediction error in the convolutional neural network by using the stochastic gradient descent method with momentum, and updating the parameter values of the convolutional neural network in step 4 specifically includes the following steps:

step 401, calculating the loss function according to the classification results, positions and classes of the objects in the bounding boxes, and the calibrated position and class of the object to be recognized in the training set by the following formula:

$$\text{loss} = \sum_{i=0}^{100} \sum_{j=0}^{7} \prod_{ij}^{obj} [(x_i - \hat{x}_i)^2 + (y_i - \hat{y}_i)^2]$$
$$+ \sum_{i=0}^{100} \sum_{j=0}^{7} \prod_{ij}^{obj} \left[ \left( \sqrt{w_i} - \sqrt{\hat{w}_i} \right)^2 + \left( \sqrt{h_i} - \sqrt{\hat{h}_i} \right)^2 \right]$$
$$+ \sum_{i=0}^{100} \sum_{j=0}^{7} \prod_{ij}^{obj} (C_i - \hat{C}_i)^2$$
$$+ \sum_{i=0}^{100} \sum_{j=0}^{7} \prod_{ij}^{noobj} (C_i - \hat{C}_i)^2$$

wherein, 100 represents the number of cells, 7 represents the number of suggestion boxes to be predicted for each cell and finally generated bounding boxes; i represents a numbering for the cells; j represents a numbering for the suggestion boxes and the bounding boxes; loss represents an error value; obj indicates the object is present; noobj indicates the object is not present; x represents a predicted value of an abscissa of the center of each of the suggestion boxes and the bounding boxes, and y represents a predicted value of an ordinate of the center of each of the suggestion boxes and the bounding boxes; w represents a predicted value of the width of each of the suggestion boxes and the bounding boxes, and h represents a predicted value of the height of each of the suggestion boxes and the bounding boxes; C represents a predicted value indicating whether the suggestion boxes and the bounding boxes contain the object, and includes A values, wherein the A values correspond to the probabilities of the A classes of objects, respectively; $\hat{x}$, $\hat{y}$, $\hat{w}$, $\hat{h}$, $\hat{C}$ represent corresponding label values; $\Pi_{ij}^{obj}$ indicates that the object falls into a $j^{th}$ suggestion box and bounding box of a cell i, and $\Pi_{ij}^{noobj}$ indicates that the object does not fall into the $j^{th}$ suggestion box and bounding box of the cell i; and step 402, according to a calculation result of the loss function, updating weights by using the stochastic gradient descent method with momentum.

In the above solution, the preprocessing in step 3 includes: augmenting the training set through random rotation, mirroring, flipping, scaling, translation, scale transformation, contrast transformation, noise disturbance and color change.

Compared with the prior art, the present invention endows the object detection network with the ability to recognize visible light and infrared objects through learning infrared images. Moreover, by improving the network structure, the method of the present invention has a better detection effect than traditional deep learning methods.

DETAILED DESCRIPTION OF THE EMBODIMENTS

In order to make the objectives, technical solutions and advantages of the present invention clearer, the present invention will be further described in detail below in conjunction with the drawings and embodiments. It should be understood that specific embodiments described herein are only used to explain the present invention and are not intended to limit the present invention.

Figure 1:
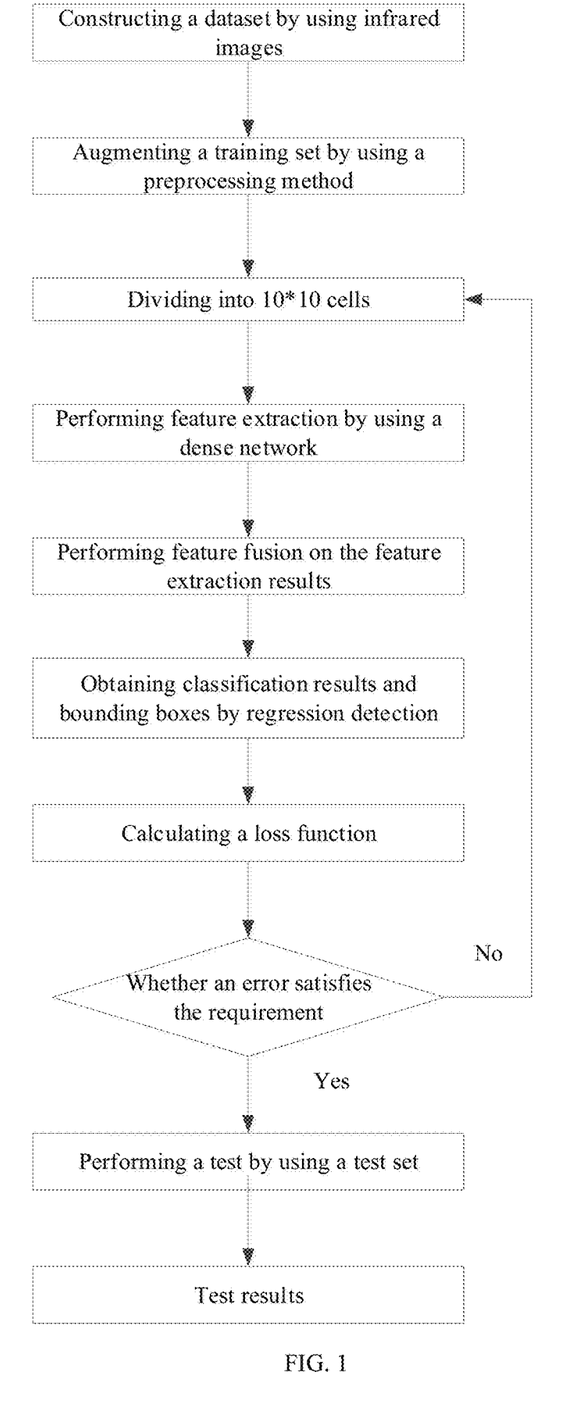
FIG. 1 is a flow chart of the method of the present invention.

An embodiment of the present invention provides a feature fusion and dense connection-based method for infrared plane object detection. As shown in FIG. 1, the method includes the following steps:

Step 1, Constructing a Dataset

If a detection algorithm is required to possess the ability to recognize infrared images, then infrared images must be added to the dataset. In the present invention, the dataset is constructed by using the infrared images, and the images in the dataset are manually labeled by using bounding boxes.

Step 2, Augmenting a Training Set

The training set is augmented by means of, for example, random rotation, mirroring, flipping, scaling, translation, scale transformation, contrast transformation, noise disturbance and color change in order to compensate for the shortcomings of difficulties in dataset collection and improve the training effect of small datasets.

Step 3, Dividing into 10*10 Cells

An original image is divided into 10*10 cells, and each cell is responsible for detecting an object of which the center falls into the cell, which greatly improves the detection speed.

Step 4, Performing Feature Extraction by Using a Dense Network

A feature extraction process includes the following steps:

Step (1), an input image is calculated by using a convolutional layer with 32 3*3 convolution kernels, and then a 2*2 pooling operation is performed on the input image to obtain a feature map $F_1$.

Step (2), feature extraction is performed on $F_1$ by using a dense block, including 64 3*3 convolution kernels and 64 1*1 convolution kernels while calculating a residual error, and then a 2*2 pooling operation is performed on $F_1$ to obtain a feature map $F_2$.

Step (3), feature extraction is performed on $F_2$ by using a dense block, including 64 1*1 convolution kernels and 64 3*3 convolution kernels while calculating a residual error, and then a 2*2 pooling operation is performed $F_2$ to obtain a feature map $F_3$.

Step (4), feature extraction is performed on $F_3$ by using a dense block, including 64 1*1 convolution kernels and 64 3*3 convolution kernels, and then a 1*1 convolution is performed on $F_3$ while calculating a residual error, and finally a 2*2 pooling operation is performed on $F_3$ to obtain a feature map $F_4$.

Step (5), feature extraction is performed on $F_4$ by using a dense block, including 256 1*1 convolution kernels and 256 3*3 convolution kernels, and then a 1*1 convolution is performed on $F_4$ while calculating a residual error, and finally a 2*2 pooling operation is performed on $F_4$ to obtain a feature map $F_5$.

Step (6), feature extraction is performed on $F_5$ by using a dense block, including 1024 1*1 convolution kernels, 1024 3*3 convolution kernels and 1024 1*1 convolution kernels, and then a 1*1 convolution is performed on $F_5$ while calculating a residual error to obtain a feature map $F_6$.

Step 5, Performing Feature Fusion on Feature Extraction Results

A method for feature fusion includes the following steps:

Step (1), the feature maps $F_4$, $F_5$, and $F_6$ obtained in step 4 are extracted.

Step (2), 2*2 pooling is performed on the feature map $F_4$ 4 times. An upper left point, an upper right point, a lower left point, and a lower right point in four cells are separately taken to form a new feature map $F_4'$, and the new feature map $F_4'$ is combined with the feature map $F_5$ to form a feature map group $F_7$.

Step (3), 2*2 pooling is performed on the feature map $F_7$ 4 times. An upper left point, an upper right point, a lower left point, and a lower right point in four cells are separately taken to form a new feature map $F_7'$, and the new feature map $F_7'$ is combined with the feature map $F_6$ to form a feature map group $F_8$.

Step 6, Obtaining Classification Results and Bounding Boxes by Regression Detection A method of obtaining the classification results and bounding boxes is as follows: for each cell, a classification and regression detection network will output positions and classes of 7 possible objects. The objects include A classes in total, that is, probabilities corresponding to the A classes of objects are output, wherein A is related to the setting of the training set. A position parameter includes 3 pieces of data, including center position coordinates, the width and the height of an object bounding box.

Step 7, Calculating a Loss Function and Updating Parameters

A loss function is calculated according to the positions and classes of the objects output in step 6 in combination with the calibrated position and class of the object to be recognized in the training set. This step is only performed during the training process. The loss function is calculated by the following formula:

$$loss = \sum_{i=0}^{100} \sum_{j=0}^{7} \prod_{ij}^{obj} [(x_i - \hat{x}_i)^2 + (y_i - \hat{y}_i)^2]$$

$$+ \sum_{i=0}^{100} \sum_{j=0}^{7} \prod_{ij}^{obj} \left[ \left(\sqrt{w_i} - \sqrt{\hat{w}_i}\right)^2 + \left(\sqrt{h_i} - \sqrt{\hat{h}_i}\right)^2 \right]$$

$$+ \sum_{i=0}^{100} \sum_{j=0}^{7} \prod_{ij}^{obj} (C_i - \hat{C}_i)^2$$

$$+ \sum_{i=0}^{100} \sum_{j=0}^{7} \prod_{ij}^{no\,obj} (C_i - \hat{C}_i)^2$$

wherein, 100 represents the number of cells, 7 represents the number of suggestion boxes to be predicted for each cell and finally generated bounding boxes; i represents a numbering for the cells; j represents a numbering for the suggestion boxes and the bounding boxes; loss represents an error value; obj indicates the object is present; noobj indicates the object is not present; x represents a predicted value of an abscissa of the center of each of the suggestion boxes and the bounding boxes, and y represents a predicted value of an ordinate of the center of each of the suggestion boxes and the bounding boxes; w represents a predicted value of the width of each of the suggestion boxes and the bounding boxes, and h represents a predicted value of the height of each of the suggestion boxes and the bounding boxes; C represents a predicted value indicating whether the suggestion boxes and the bounding boxes contain the object, and includes A values, wherein the A values correspond to the probabilities of the A classes of objects, respectively; $\hat{x}$, $\hat{y}$, $\hat{w}$, $\hat{h}$, $\hat{C}$ represent corresponding label values; $\Pi_{ij}^{obj}$ indicates that the object falls into a $j^{th}$ suggestion box and bounding box of a cell i, and $\Pi_{ij}^{noobj}$ indicates that the object does not fall into the $j^{th}$ suggestion box and bounding box of the cell i. Then, according to the calculation result of the loss function, the weights are updated by using a stochastic gradient descent method with momentum.

Steps 3-7 are repeated until the error satisfies the requirement or the number of iterations reaches a set upper limit.

Step 8, Performing a Test by Using a Test Set

Images in a validation set are processed by using an object detection network trained in step 7 to obtain the accuracy and required time for object detection, and a final object detection result map.

Figure 2:
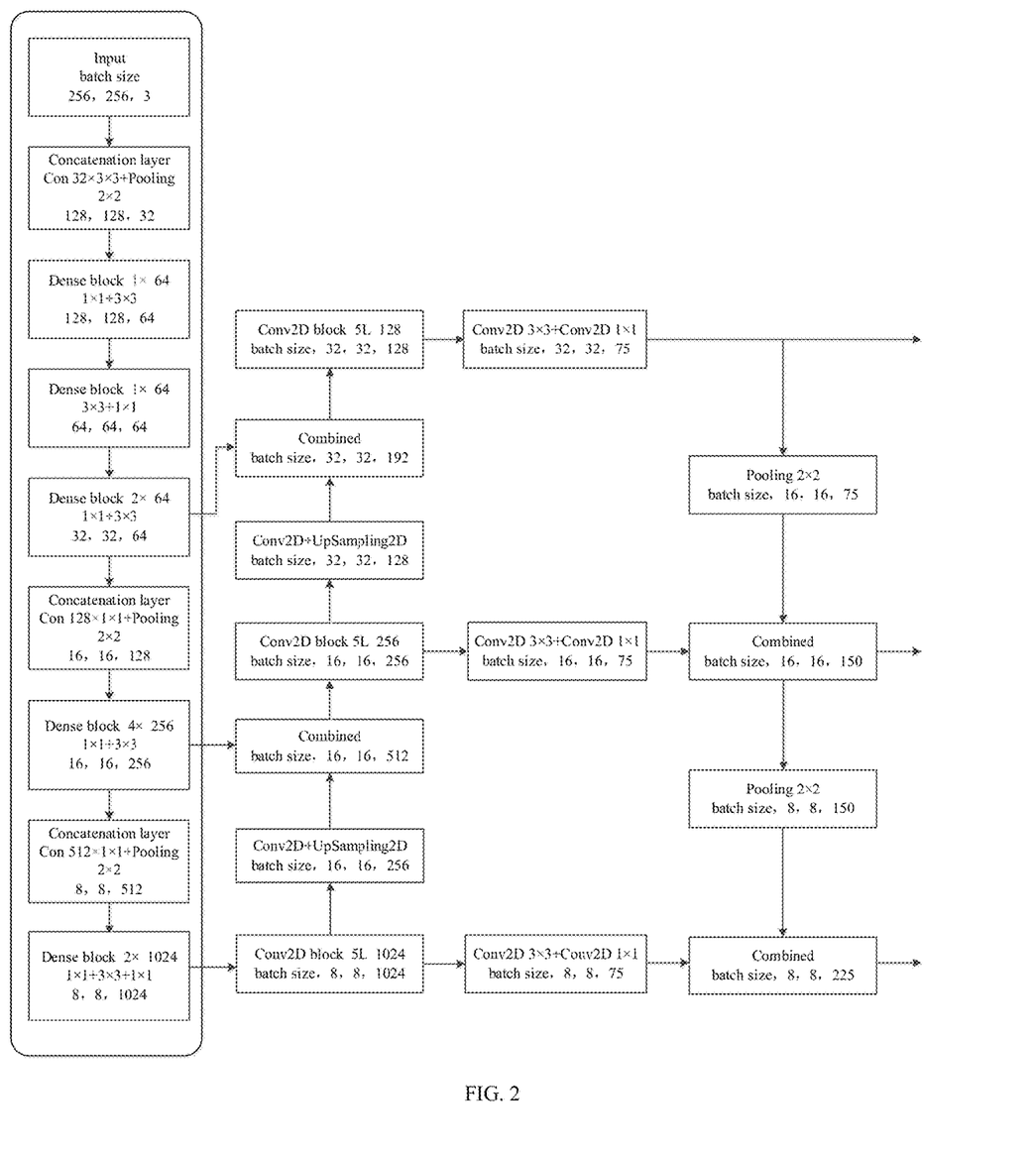
FIG. 2 is a schematic diagram of the network structure of the present invention.

The network structure of the present invention will be further described below with reference to FIG. 2.

1. Network Layer Setting

The neural network used in the present invention is divided into a feature extraction network and a feature fusion and regression detection network. The feature extraction network is composed of 5 dense blocks and contains a convolutional neural network with 25 convolutional layers in total. The feature fusion and regression detection network contains a convolutional neural network with 8 convolutional layers and a fully convolutional network with 1 convolutional layer.

2. Dense Block Setting

Dense blocks used in the feature extraction network are set as follows:

(1) Dense block 1 includes a convolutional neural network with 2 convolutional layers. The first layer uses 64 convolution kernels with a size of 1*1 and a stride of 1. The second layer uses 64 convolution kernels with a size of 3*3 and a stride of 1. The dense block 1 is used one time.

(2) Dense block 2 includes a convolutional neural network with 2 convolutional layers. The first layer uses 64 convolution kernels with a size of 3*3 and a stride of 1. The second layer uses 64 convolution kernels with a size of 1*1 and a stride of 1. The dense block 2 is used one time.

(3) Dense block 3 includes a convolutional neural network with 2 convolutional layers. The first layer uses 64 convolution kernels with a size of 1*1 and a stride of 1. The second layer uses 64 convolution kernels with a size of 3*3 and a stride of 1. The dense block 3 is used two times.

(4) Dense block 4 includes a convolutional neural network with 2 convolutional layers. The first layer uses 256 convolution kernels with a size of 1*1 and a stride of 1. The second layer uses 256 convolution kernels with a size of 3*3 and a stride of 1. The dense block 4 is used four times.

(5) Dense block 5 includes a convolutional neural network with 3 convolutional layers. The first layer uses 1024 convolution kernels with a size of 1*1 and a stride of 1. The second layer uses 1024 convolution kernels with a size of 3*3 and a stride of 1. The third layer uses 1024 convolution kernels with a size of 1*1 and a stride of 1. The dense block 5 is used two times.

3. Feature Fusion Setting

Three groups of feature maps used in feature fusion are derived from the results of the $9^{th}$ layer, the $18^{th}$ layer and the $25^{th}$ layer of the feature extraction network. Then, the generated feature map is combined with a shallow feature map through convolutions and upsampling. The results obtained are further processed through 3*3 convolutional layers and 1*1 convolutional layers, and then feature fusion is performed on the obtained three groups of new feature maps.

The simulation effect of the present invention will be further described below with reference to FIG. 3A FIG. 3B, FIG. 3C and FIG. 3D.

Figure 3A:
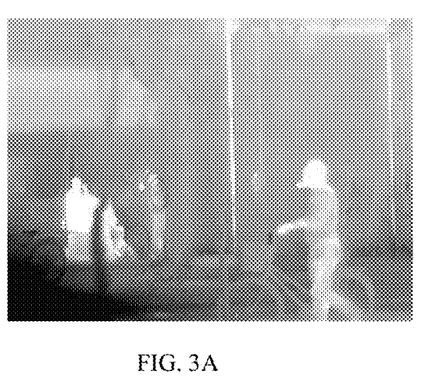
FIG. 3A is a map to be detected.

1. Simulation Conditions:

The to-be-detected image used in the simulation has a size of 480×640, and contains pedestrians and bicycles.

Figure 3B:
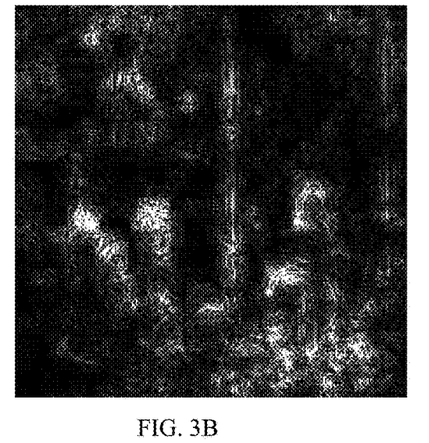
FIG. 3B is a feature map extracted by a shallower network.
Figure 3C:
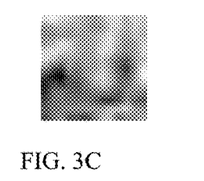
FIG. 3C is a feature map extracted by a deeper network.
Figure 3D:
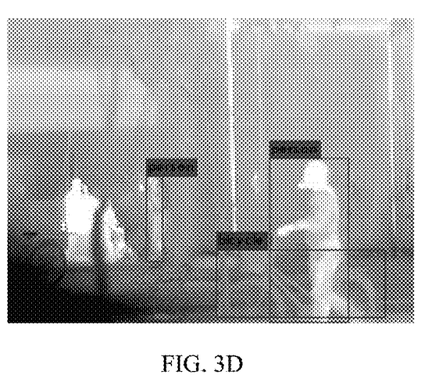
FIG. 3D a detection result map.

2. Simulation Results and Analysis:

FIG. 3A is a map to be detected; FIG. 3B is a feature map obtained by extraction; FIG. 3D is a detection result map.

Feature extraction is performed on FIG. 3A by using the dense network to obtain a series of feature maps. Since there are too many feature maps obtained in the intermediate process, only two of these feature maps are extracted, i.e., FIG. 3B and FIG. 3C. FIG. 3B is a feature map extracted by a shallower network, has a larger image size, and contains more detailed information while less semantic information. FIG. 3C is a feature map extracted by a deeper network, has a smaller image size, and contains less detailed information while more semantic information.

After fusion and regression detection are performed on the feature maps, the positions of the pedestrians and bicycles are obtained, and then labeled on the original image to obtain the final result map shown in FIG. 3D.

The above descriptions are only the preferred embodiments of the present invention, and are not used to limit the scope of protection of the present invention.

What is claimed is:

1. A feature fusion and dense connection-based method for an infrared plane object detection, comprising the following steps:

step 1, constructing an infrared image dataset containing an object to be recognized, calibrating a position and a class of the object to be recognized in the infrared image dataset, and obtaining an original known label image;

step 2, dividing the infrared image dataset into a training set and a validation set;

step 3, performing an image enhancement preprocessing on images in the training set to obtain preprocessed images;

step 4, performing a feature extraction and a feature fusion on the preprocessed images, and obtaining classification results and bounding boxes through a regression network; calculating a loss function according to the classification results and the bounding boxes in combination with the original known label image, back-propagating a prediction error in a convolutional neural network by using a stochastic gradient descent method with momentum, and updating parameter values of the convolutional neural network;

step 5, repeating step 3 and step 4 to iteratively update the parameter values of the convolutional neural network until an error is small enough or a number of iterations reaches a set upper limit; and step 6, processing images in the validation set through parameters of a trained convolutional neural network to obtain an accuracy and a required time for the infrared plane object detection, and a final object detection result map.

2. The feature fusion and dense connection-based method for the infrared plane object detection according to claim 1, wherein the step of performing the feature extraction and the feature fusion on the preprocessed images, and obtaining the classification results and the bounding boxes through the regression network in step 4 specifically comprises the following steps:

step 401, randomly extracting a fixed number of images from the training set, and dividing each image of the images from the training set into 10×10 cells;

step 402, inputting the each image divided in step 401 into a densely connected network for the feature extraction to obtain extracted feature maps;

step 403, performing the feature fusion on the extracted feature maps to obtain a fused feature map;

step 404, generating a fixed number of suggestion boxes for each cell of the 10×10 cells in the fused feature map; and step 405, sending the fused feature map and the suggestion boxes to the regression network for a classification and a bounding box regression, and removing a redundancy by using a non-maximum suppression method to obtain the classification results and the bounding boxes.

3. The feature fusion and dense connection-based method for the infrared plane object detection according to claim 2, wherein a calculation method for the densely connected network in step 402 is expressed as the following formula:

$$d_l = H_l([d_0, d_1, \ldots, d_{l-1}]);$$

wherein, $d_l$ represents an output result of an $l^{th}$ convolutional layer in the densely connected network, and if the densely connected network contains a total of B convolutional layers, then a value of l is in a range of 0-B; $H_l(*)$ represents a combined operation of regularization, a convolution and a linear rectification activation function; $d_0$ represents an input image; and $d_{l-1}$ represents an output result of an $(l-1)^{th}$ layer.

4. The feature fusion and dense connection-based method for the infrared plane object detection according to claim 3, wherein
the step of performing the feature fusion on the extracted feature maps in step 403 comprises: directly fusing the extracted feature maps of different scales through a pooling method.

5. The feature fusion and dense connection-based method for the infrared plane object detection according to claim 4, wherein
the step of performing the feature fusion on the extracted feature maps in step 403 specifically comprises the following steps:
step 4031, converting a first group of feature maps $F_1$ into a new smaller feature map through a pooling operation, and then fusing the new smaller feature map with a second group of feature maps $F_2$ to obtain a new feature map $F_2'$;
step 4032, performing the pooling operation on the new feature map $F_2'$, and then fusing with a third group of feature maps $F_3$ to obtain a new feature map $F_3'$; and
step 4033, replacing the second group of feature maps $F_2$ and the third group of feature maps $F_3$ with the new feature map $F_2'$ and the new feature map $F_3'$ to enter the regression network.

6. The feature fusion and dense connection-based method for the infrared plane object detection according to claim 5, wherein
the step of sending the fused feature map and the suggestion boxes to the regression network for the classification and the bounding box regression, and removing the redundancy by using the non-maximum suppression method to obtain the classification results and the bounding boxes in step 405 specifically comprises the following steps:
step 4051, dividing the fused feature map into 10×10 cells, and inputting the fused feature map into a regression detection network;
step 4051, for each cell of the 10×10 cells of the fused feature map, outputting positions and classes of 7 possible objects by the regression detection network, wherein the 7 possible objects comprise A classes in total, probabilities corresponding to the A classes of the 7 possible objects are output, wherein A is related to a setting of the training set; and a position parameter comprises 3 pieces of data comprising center position coordinates, a width and a height of an object bounding box;
step 4052, according to the non-maximum suppression method, calculating an intersection-over-union of the bounding boxes of the same class by using the following formula:

$$S = \frac{M \cap N}{M \cup N};$$

wherein, S represents the intersection-over-union, M and N represent two bounding boxes of the same class of objects, M∩N represents an intersection of a bounding box M and a bounding box N, and M∪N represents a union of the bounding box M and the bounding box N; and
removing a bounding box with a smaller classification result value from the two bounding boxes with S greater than 0.75.

7. The feature fusion and dense connection-based method for the infrared plane object detection according to claim 6, wherein
the step of calculating the loss function according to the classification results and the bounding boxes in combination with the original known label image, back-propagating the prediction error in the convolutional neural network by using the stochastic gradient descent method with the momentum, and updating the parameter values of the convolutional neural network in step 4 specifically comprises the following steps:
step 401, calculating the loss function according to the classification results, positions and classes of the 7 possible objects in the bounding boxes, and the position and the class of the object to be recognized in the training set by the following formula:

$$loss = \sum_{i=0}^{100} \sum_{j=0}^{7} \prod_{ij}^{obj} [(x_i - \hat{x}_i)^2 + (y_i - \hat{y}_i)^2]$$
$$+ \sum_{i=0}^{100} \sum_{j=0}^{7} \prod_{ij}^{obj} \left[ \left(\sqrt{w_i} - \sqrt{\hat{w}_i}\right)^2 + \left(\sqrt{h_i} - \sqrt{\hat{h}_i}\right)^2 \right]$$
$$+ \sum_{i=0}^{100} \sum_{j=0}^{7} \prod_{ij}^{obj} (C_i - \hat{C}_i)^2$$
$$+ \sum_{i=0}^{100} \sum_{j=0}^{7} \prod_{ij}^{noobj} (C_i - \hat{C}_i)^2$$

wherein, 100 represents a number of the 10×10 cells, 7 represents a number of the suggestion boxes to be predicted for the each cell and the bounding boxes; i represents a numbering for the 10×10 cells; j represents a numbering for the suggestion boxes and the bounding boxes; loss represents an error value; obj indicates the object is present; noobj indicates the object is not present; x represents a predicted value of an abscissa of a center of each of the suggestion boxes and the bounding boxes, and y represents a predicted value of an ordinate of the center of each of the suggestion boxes and the bounding boxes; w represents a predicted value of a width of each of the suggestion boxes and the bounding boxes, and h represents a predicted value of a height of each of the suggestion boxes and the bounding boxes; C represents a predicted value indicating whether the suggestion boxes and the bounding boxes contain the object, and C comprises A values, wherein the A values correspond to the probabilities of the A classes of the 7 possible objects, respectively; $\hat{x}$, $\hat{y}$, $\hat{w}$, $\hat{h}$, $\hat{C}$ represent corresponding label values; $\Pi_{ij}^{obj}$ indicates that the object falls into a $j^{th}$ suggestion box and a $j^{th}$ bounding box of a cell i, and $\Pi_{ij}^{noobj}$ indicates that the object does not fall into the $j^{th}$ suggestion box and the $j^{th}$ bounding box of the cell i; and step 402, according to a calculation result of the loss function, updating weights by using the stochastic gradient descent method with the momentum.

8. The feature fusion and dense connection-based method for the infrared plane object detection according to claim 1, wherein the image enhancement preprocessing in step 3 comprises: augmenting the training set through a random rotation, mirroring, flipping, scaling, a translation, a scale transformation, a contrast transformation, a noise disturbance and a color change.

9. The feature fusion and dense connection-based method for the infrared plane object detection according to claim 2, wherein the image enhancement preprocessing in step 3 comprises: augmenting the training set through a random rotation, mirroring, flipping, scaling, a translation, a scale transformation, a contrast transformation, a noise disturbance and a color change.

10. The feature fusion and dense connection-based method for the infrared plane object detection according to claim 3, wherein the image enhancement preprocessing in step 3 comprises: augmenting the training set through a random rotation, mirroring, flipping, scaling, a translation, a scale transformation, a contrast transformation, a noise disturbance and a color change.

11. The feature fusion and dense connection-based method for the infrared plane object detection according to claim 4, wherein the image enhancement preprocessing in step 3 comprises: augmenting the training set through a random rotation, mirroring, flipping, scaling, a translation, a scale transformation, a contrast transformation, a noise disturbance and a color change.

12. The feature fusion and dense connection-based method for the infrared plane object detection according to claim 5, wherein the image enhancement preprocessing in step 3 comprises: augmenting the training set through a random rotation, mirroring, flipping, scaling, a translation, a scale transformation, a contrast transformation, a noise disturbance and a color change.

13. The feature fusion and dense connection-based method for the infrared plane object detection according to claim 6, wherein the image enhancement preprocessing in step 3 comprises: augmenting the training set through a random rotation, mirroring, flipping, scaling, a translation, a scale transformation, a contrast transformation, a noise disturbance and a color change.

14. The feature fusion and dense connection-based method for the infrared plane object detection according to claim 7, wherein the image enhancement preprocessing in step 3 comprises: augmenting the training set through a random rotation, mirroring, flipping, scaling, a translation, a scale transformation, a contrast transformation, a noise disturbance and a color change.

\* \* \* \* \*